United States Patent [19]

Dvorak et al.

[11] Patent Number: 4,661,739

[45] Date of Patent: Apr. 28, 1987

[54] WELDED TUNGSTEN FILAMENT TO LEAD JOINT

[75] Inventors: Antonin J. Dvorak, Richmond Hts.; Francis C. Toth, Euclid, both of Ohio

[73] Assignee: General Electric Company, Schenectady, N.Y.

[21] Appl. No.: 475,208

[22] Filed: Mar. 14, 1983

Related U.S. Application Data

[63] Continuation of Ser. No. 202,131, Oct. 30, 1980, abandoned.

[51] Int. Cl.$^4$ ............................................... H01J 5/50
[52] U.S. Cl. .................................... 313/333; 313/341; 445/48
[58] Field of Search .................. 313/333, 341; 445/48, 445/32, 27

[56] References Cited

U.S. PATENT DOCUMENTS

| | | | |
|---|---|---|---|
| 1,022,553 | 4/1912 | Howell | 313/333 |
| 2,359,302 | 10/1944 | Curtis | 313/333 |
| 2,403,070 | 7/1946 | Fulton | 313/333 |

FOREIGN PATENT DOCUMENTS 230586  6/1959  Australia ............................. 445/48

Primary Examiner—Harold A. Dixon
Attorney, Agent, or Firm—Philip L. Schlamp; Fred Jacob

[57] ABSTRACT

In a brazed joint between a coiled tungsten filament and a molybdenum lead, the lead continues integrally into a braze section which extends longitudinally within the coiled filament. The braze section may be formed by suddenly melting the portion of the lead used in the joint by a pulse discharge in an inert or reducing gas. The liquid molybdenum wets the tungsten and is drawn by capillarity into the turns of the coiling where it is rapidly chilled and solidifies in a time interval too short for appreciable crystal growth and embrittlement to occur in the tungsten.

9 Claims, 7 Drawing Figures

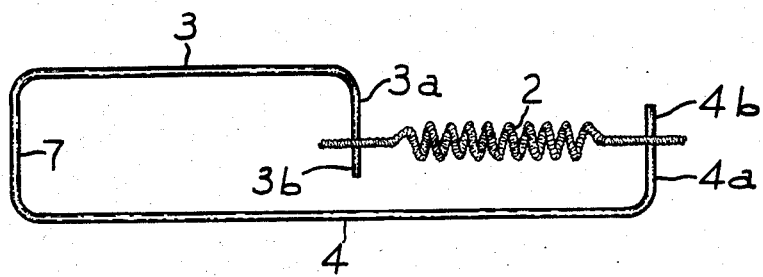
Fig. 2
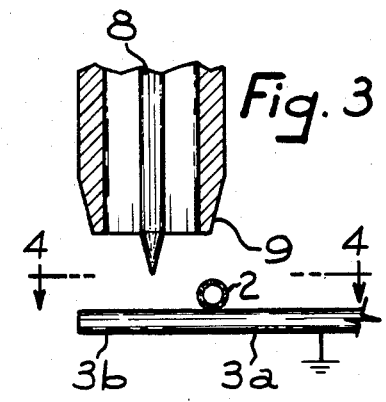
Fig. 3
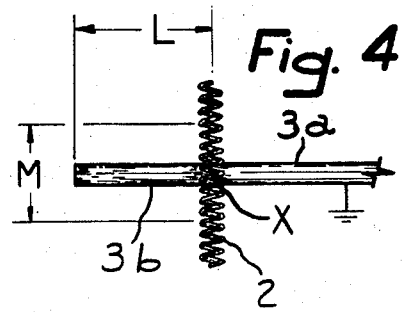
Fig. 4
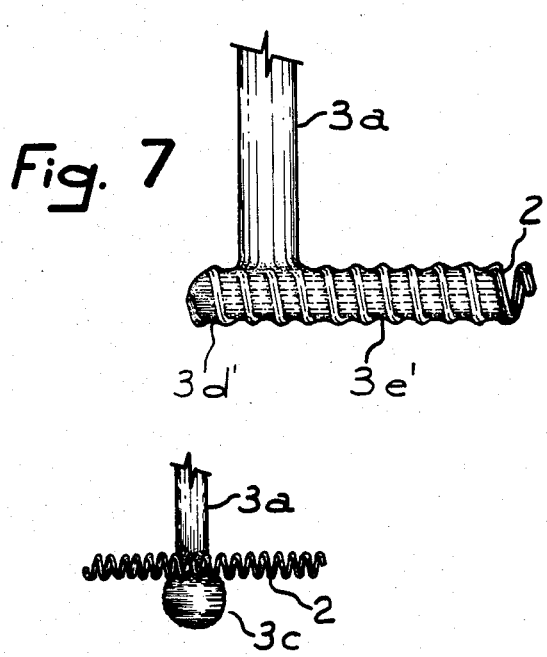
Fig. 7
Fig. 5
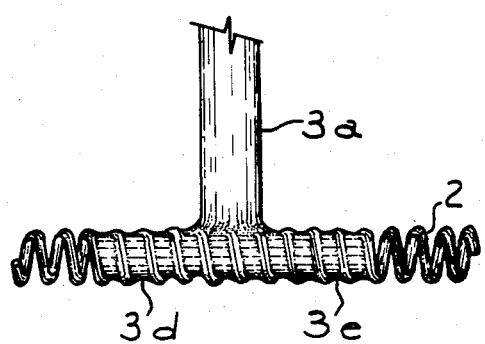
Fig. 6

WELDED TUNGSTEN FILAMENT TO LEAD JOINT

This application is a continuation of application Ser. No. 202,131, filed Oct. 30, 1980, now abandoned.

Our invention relates to the attachment of the filaments to the supports or inleads in electric lamps and similar sealed devices, and provides a high quality welded joint between a coiled tungsten filament and a molybdenum lead which avoids embrittlement of the filament.

BACKGROUND OF THE INVENTION

The most critical part of an electric lamp or light bulb is its filament. It is almost always made of tungsten because tungsten has the highest melting point of all known practical materials. Electric lamps are ordinarily gas-filled in order to reduce the rate of vaporization of the tungsten filament, and in gas-filled lamps, efficacy in producing light is increased by coiling the filament. In the common sizes of domestic incandescent lamps, the so-called bread-and-butter lamps, a coiled coil design is generally used.

In low cost mass-produced incandescent lamps, the filament is attached to the lead wires in the simplest manner possible. The ends of the filament are placed in open hooks formed on the ends of the lead wires, and these hooks are then folded back and closed by automated apparatus. The folded hooks pinch the filament and since the coiled end are deformed as a result, the process must be restricted to ductile filaments which have not been heat-treated to achieve recrystallization.

In higher wattage or higher quality lamps such as halogen cycle and photo-projection lamps, greater filament stability together with longer life duration are sought. In such lamps filaments are used which have been recrystallized by firing prior to mounting in order to eliminate internal strains and expel impurities. By so doing, the shape and dimensions of the filament are stabilized for subsequent lamp operation. However such filaments are more brittle and the brittleness makes the attachment of the filament to the inleads or to the lead wires of the lamp frame structure much more difficult. Since the simple hook-clamp is ruled out, various alternative attachment techniques have been developed and that most commonly used is known as spudding. It involves forcing a wire or spud into the end turns or coils of the filament to achieve a tight friction fit. In a spudded joint the electrical connection is essentially a mechanical contact.

Various improvements to the simple spud have been made over the years. U.S. Pat No. 2,449,679—van Horn (1948) uses a spud in which screw threads have been formed either by a screw cutting operation or by winding fine wire tightly around it. U.S. Pat. No. 2,830,217—Hodge (1958) uses a spud in which the end of the conductor is flattened to provide a spade-like tip in order to effect a force fit with the filament coil. Attempts have also been made to combine spudding with welding, for instance in U.S. Pat. No. 2,403,070—Fulton (1946). In the Fulton patent, in order to assure that the portion of the filament that takes the stresses and strains be free of embrittlement due to welding, the coiled filament is welded to the spud at the end remote from the entry point only.

All spudding techniques and improvements thereon, including spudding combined with welding, are essentially labor-intensive and have not been amenable to automation.

SUMMARY OF THE INVENTION

The object of our invention is to provide a welded joint between a lead wire and heat-treated tungsten filament without causing deleterious embrittlement in the filament or in the lead, and to achieve such joint by a simple process amenable to automation.

In joining to tungsten, one cannot afford to overheat the tungsten to an extent that allows deleterious crystal growth and the resulting embrittlement to take place. The attachment points of the filament in particular are high stress points and embrittlement at those points must at all costs be avoided. Our success is predicated on utilizing the knowledge that embrittlement of tungsten is a function of both temperature and time.

In a welded joint embodying our invention, a lead wire of a metal suitable for brazing to tungsten continues integrally into a weld section extending longitudinally within a coiled tungsten filament portion. The tungsten is not embrittled at the joint and this is achieved by utilizing a burst of energy to heat suddenly above its melting temperature in an inert or reducing environment substantially only the small quantity of the lead wire metal that will be used in the joint. Because the quantity of melted metal is small, loss of heat to the surround including the main part of the lead and the tungsten filament which is contacted by the melted metal, causes a drop in temperature so rapid that tungsten embrittlement is substantially avoided. To avoid losing the cooling effect of the lead, the heating time or duration of the energy burst should not exceed one second, and we prefer to have it shorter. By virtue of the rapid cooling which follows the pulse, there is insufficient time for appreciable grain growth to occur in the tungsten contacted by the melted metal. In addition the melted metal is already cooling when it contacts the tungsten and this also serves to reduce the extent and time duration of heating the tungsten and further limits crystal growth. The energy pulse may be provided in various ways: a pulse electric discharge is preferred; other energy-emitting sources may also be used, such as an electron beam or a laser. The inert or reducing environment may be an inert or reducing atmosphere or a vacuum.

In a preferred technique embodying our invention, we juxtapose the end of a molybdenum lead to the coiled end or leg of a tungsten filament, preferably in such manner that the lead and the coiled leg intersect near their ends. Then, by means of a discharge or arc pulse drawn from a tungsten electrode in inert gas (pulsed TIG welding) to the part of the molybdenum lead projecting beyond the coiled filament leg, the projecting lead part is caused to melt rapidly, preferably in less than 500 milliseconds. The inert gas cleans the heated molybdenum and tungsten in the region of the arc and prevents any formation of oxide. As a result, the liquid molybdenum wets the tungsten and is drawn by capillarity into the turns of the coil where it is rapidly chilled and solidifies. The time interval involved from the initiation of the pulse to the moment when the tungsten has cooled to its recrystallization temperature of about 2200° C. is two seconds or less and is too short to allow objectionable embrittlement of the tungsten. The time interval is preferably 750 milliseconds or less to allow no significant embrittlement to occur. Furthermore, the liquid molybdenum progressively cools as it spreads and advances through the turns of the tungsten filament and is coolest at its point of furthest penetration. This ultimate point of advance is also the first point of attachment of the tungsten filament where stress tends to maximize, and our invention thus effectively achieves least embrittlement at that critical point.

DESCRIPTION OF DRAWINGS

FIG. 2 is a plan view looking down on the frame formed by the leads to support the filament.

FIG. 3 is an enlarged end view of the coiled filament leg resting on the lead with the welding electrode in place over the projecting portion of the lead.

FIG. 4 is a plan section through FIG. 3 along line 4—4.

FIG. 5 is an enlarged plan view of the joint in formation showing the projection portion of the lead formed into a molten ball.

FIG. 6 is a yet more enlarged view showing a completed symmetrical filament joint embodying the invention.

FIG. 7 shows an asymmetrical filament joint embodying the invention drawn to the same scale as FIG. 6.

DETAILED DESCRIPTION

Figure 1:
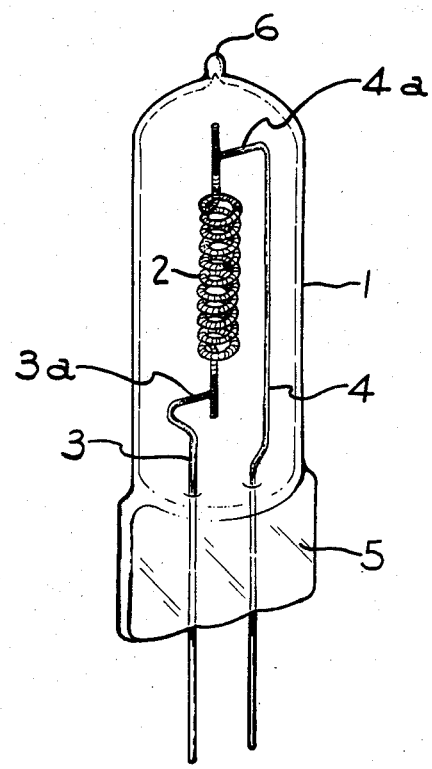
FIG. 1 is a perspective view of a single-ended tungsten halogen incandescent lamp having welded joints embodying the invention.

Referring particularly to FIG. 1 of the drawings, the illustrated single-ended lamp is of the high intensity compact halogen-cycle type comprising a tubular bulb or envelope 1 containing a longitudinally extending filament 2 of coiled tungsten wire, here shown as a coiled coil. The bulb contains a gas filling consisting primarily of an inactive gas such as nitrogen, or an inert gas such as argon, or mixtures of such gases at a pressure of several hundred torr and even substantially exceeding atmospheric. Included in the gas filling is a small quantity of iodine or bromine vapor which serves as a regenerative getter to maintain the walls of the bulb free from deposits of tungsten vaporized from the filament. In order to maintain the tungsten halogen regenerative cycle in operation, the bulb walls must be maintained at a relatively high temperature in excess of 250° C., for example about 500° C. Accordingly, bulb 1 is made of glass having a relatively high softening point, such as one of the well-known so-called hard glasses like borosilicate or aluminosilicate glasses, or quartz glass. The filament 2 is of any desired capacity sufficient to maintain the required bulb wall temperature, for example about 150 watts or more for operation from a conventional power supply source. The illustrated filament is actually for operation at 150 watts from a 115 volt supply.

The filament 2 is supported along the longitudinal axis of the bulb by short and along inner lead wires 3 and 4, respectively, terminating in transverse arms 3a and 4a extending towards the axis of the bulb. The lead wires are suitably made of ductile molybdenum sufficiently rigid to support the filament, and they are embedded in and extend through a pinch seal 5 in the lower end of the lamp. If desired, the portions of the lead wires which are embedded in the seal 5 may be precoated or beaded with glass in known manner to facilitate sealing. Although the lead wires 3,4 are here shown as made of a single continuous length of molybdenum wire, composite wires are frequently used in which the externally projecting portions of the leads consist of wire of different composition such as a nickel-iron alloy. Also when the envelope 1 consists of quartz or fused silica, the leads 3,4 will include thin foil portions to assure a hermetic seal in the region of the compressed pinch seal portion 5. After the envelope has been pinch-sealed, the lamp is flushed and filled with the gas mixture through an exhaust tube attached to the top of the bulb and which leaves the vestige 6 when tipped off.

The present lamp is intended as a high performance lamp and, accordingly, the filament 2 has been fired in order to stabilize the fibrous crystal structure of the tungsten and in order to drive out any contaminants. However, fired tungsten filaments are brittle and in the past this has made the attachment of the filament to the lamp frame difficult. The technique formerly used with the present lamp was to insert spuds into the filament legs, secure them with resistance welds and then weld the spuds to the lead wires. The process was expensive and relatively unreliable because it required precision handling of many parts.

Our invention provides a welded joint which is more reliable than a spudded joint and cheaper to make. Molybdenum whose melting point is about 2620° C. is a good welding metal for tungsten having a melting point of about 3370° C. In welding the tungsten filament to the molybdenum lead wires 3,4 by the process of our invention, it is convenient to utilize a so-called hairpin wire frame as shown in FIG. 2. The frame includes the leads 3 and 4 joined by a bridging portion 7 which maintains the parts in the desired spacial relationship during assembly and welding. By way of example the leads 3 and 4 are spproximately 0.020" wire and the filament consists of 0.002" tungsten wire. The coiled coil filament 2 is laid to bridge the gap between the transversely turned arms 3a and 4a of the frame with the linear coiled leg portions crossing and extending beyond the arms. A suitable fixture, not shown in the drawing, holds the filament and frame in the relative positions desired for them subsequent to welding. Referring to FIGS. 3 and 4, the length L of the underhang or projection of end portion 3b (or 4b) of the arm beyond the filament is determined on the basis of the volume of molybdenum required for the weld. For a braze section that will extend in both directions from the cross-over point X, there must be a volume of molybdenum sufficient to fill several turns of the filament leg extending in both directions from the intersection. The weld section extends within the filament a distance at least equal to and preferably greater than the diameter of the lead. The length of coiled filament that will be filled by molybdenum is indicated by M in FIG. 4.

The hairpin frame is grounded, preferably at a point of arm 3a close to the intersection with the filament leg, as schematically indicated in FIGS. 3 and 4, and in similar fashion (not shown) at a pont of arm 4a. The tungsten electrode 8 of the tungsten inert gas (TIG) welding equipment is placed vertically over the projecting portion 3b of the molybdenum lead. The electrode tip should be close enough to the filament 2 to allow some heat splash or spillover to the filament but the distance from tip to lead should be less than that from tip to filament to assure that the arc discharge occurs to the lead and not to the filament. The electrode is surrounded by a ceramic tube or sleeve 9 through which an inert cover gas is discharged to envelop the weld region and shield it from air. A suitable gas is argon, preferably with a small percentage (5%) of hydrogen that produces a hotter arc and provides a reducing atmosphere. The reducing atmosphere removes oxides in the weld area and promotes metal flow.

To make the weld, the inert cover gas is turned on and a pulse of electric current, suitably about 100 milliseconds in time duration, is discharged between the electrode and the molybdenum lead. The molybdenum lead end 3b melts and balls up into a sphere 3c over which the filament leg 2 extends as shown in FIG. 5. Within a very short time interval the molten molybdenum wets the tungsten filament and is drawn by capillary action into its turns approximately equal distances 3d and 3e on each side of the intersection with the lead 3a as shown in FIG. 6. That portion of the filament in which the molybdenum has coalesced with tungsten and substantially filled the volume encompassed by the turns of the filament, as shown at 3d and 3e in FIG. 6 and at 3d' and 3e' in FIG. 7, will be referred to as the weld section. Prior to welding, the filament leg 2 passed above the lead 3a as shown in FIG. 3 but the fixture (not shown) which holds the filament in place tended to force the leg into the same plane as the lead. When the projecting portion 3b becomes molten, the pressure exerted by the fixture and also surface tension cause the filament leg to center itself with respect to the lead leg 3a so that their centerlines now share the common point X. Loss of heat by radiation, to the filament and to the frame by conduction, and to the cover gas by convection, rapidly cools and solidifies the weld section. The weld from the long lead 4 may be made simultaneously in the same way. The cover gas is now stopped and the cycle is complete. After the hairpin frame has been pinch-sealed into a lamp envelope as shown in FIG. 1, the outer bridging portion 7 is cut off to leave leads of appropriate length emerging from the lamp envelope.

In FIG. 6 a symmetrical weld joint is illustrated in which the weld section, that is the extent of molybdenum penetration into the filament leg, on each side of the lead is equal. FIG. 7 illustrates an asymmetrical joint which is achieved by shortening the extent of projection of the filament leg beyond the lead prior to making the weld. The molybdenum then readily fills the short distance 3d' to the cut end on the left because there is less heat loss from it and it is hotter. The molybdenum also penetrates the distance 3e to the right which may be longer or shorter depending upon the volume of weld metal. An asymmetrical weld may be used to reduce waste of filament since it is only the portion of the filament leg continuing into the coil that is useful. In fact the lead may be welded into the very end of the filament leg if desired to reduce waste to a minimum. On the other hand, a symmetrical joint as illustrated in FIG. 6 has the advantage that the variability in effective filament length and the resultant volume of weld metal due to tolerance or error in the length of the underhang is reduced in half.

The more important process parameters which must be controlled to make good joints between lead and coiled tungsten filament are the following:

1. Length of underhang

The length of the underhang controls directly the volume of weld metal, and the dimension M. It must also be sufficient to permit the electrical discharge to take place to the lead portion 3b and not to the tungsten filament.

2. Heating

A quantity of electrical energy is supplied sufficient to melt the volume of molybdenum chosen for the weld. The arc power, that is the rate at which heat is supplied, is preferably optimized to melt the molybdenum as rapidly as possible without causing uncontrolled spattering or excessive vaporization of material.

3. Cooling

The heat input into the weld is cut off entirely when the pulse is ended and the rate of cooling is controlled primarily by the conductivity of the frame, by the heat sink provided by the components, and by the rate of cover gas flow. The rate of cooling is maximized in order to protect the tungsten filament grain structure from undesirable crystallization and embrittlement.

4. Oxidation

Oxidation of the tungsten filament or of the molybdenum is prevented by sufficient flow of inert cover gas. Addition of a few percent of hydrogen to the argon cover gas is desirable to promote quick movement of the molten molybdenum into the coiled filament.

5. Material Selection

The material selected for the frame or lead wire which forms the weld should meet the requirements for a lead imposed by the lamp in addition to having a melting temperature appreciably below that of the coiled tungsten filament. Molybdenum is a good choice because it can be sealed directly to hard glass or quartz and is refractory enough for the lamp application. Nickel and iron may also be used.

We have utilized the foregoing criteria in tests of our invention and have achieved good process consistency. Metallographic photographs indicate no significant changes in the crystallographic structure of the filament. This is confirmed by mechanical tests which have shown no deterioration in the strength of the filament as a result of the weld. It will be apparent that the welding process which we have described does not include any operation requiring a high level of manual skill or dexterity on the part of an operator, and our process is readily adaptable to automation for lamp manufacture.

What we claim as new and desire to secure by Letters Patent of the United States is:

1. A tungsten filament to lead wire joint comprising:
    a tungsten filament of recrystallized wire having a coiled portion,
    a lead wire of metal other than tungsten entering said coiled portion and continuing integrally into a weld section extending longitudinally within said coiled portion,
    said weld section comprising metal from the lead wire coalesced with and substantially filling the turns of the filament within said section,
    said tungsten filament being substantially undeformed and exhibiting no significant change in its crystallographic structure where it enters the weld section.

2. A tungsten filament to lead wire joint as in claim 1 wherein said lead wire is of molybdenum.

3. A tungsten filament to lead wire joint as in claim 1 wherein said weld section extends through the coiled portion a distance no less than the diameter of the lead wire.

4. A tungsten filament to lead wire joint as in claim 1 wherein said lead wire enters the coiled portion from the side at an intermediate point.

5. The method of making a joint between a tungsten filament having a coiled portion and a metal lead wire which comprises:

juxtaposing said coiled portion to an end portion of the lead wire having a volume adequate to fill several turns of coiling of the coiled portion, suddenly melting said end portion under inert or reducing conditions whereby the molten metal wets the tungsten and is drawn by capillarity into the coiling and solidifies therein, and controlling the rate of supplying energy to said end portion and the rate of cooling the molten metal thereafter to achieve first melting and thereafter solidification in a time interval too short to allow significant change in the crystallographic structure of the tungsten where it is contacted by metal from the lead wire.

6. The method defined in claim 5 wherein the coiled portion of the filament and the lead wire are juxtaposed in such fashion that they contact and intersect near their ends and the projecting end portion of the lead wire is melted and drawn by capillarity into said coiled portion.

7. The method defined in claim 5 wherein said end portion is melted by an electric discharge pulse thereto in inert or in reducing gas.

8. The method of making a joint between a tungsten filament having a coiled portion and a metal lead wire which comprises:

juxtaposing said coiled portion to an end portion of the lead wire having a volume adequate to fill several turns of coiling of the coiled portion, suddenly melting said end portion under inert or reducing conditions whereby the molten metal wets the tungsten and is drawn by capillarity into the coiling and solidifies therein, and controlling the rate of supplying energy to said end portion and the rate of cooling the molten metal thereafter to achieve first melting and thereafter solidification in a time interval too short to allow significant change in the crystallographic structure of the tungsten where it is contacted by metal from the lead wire, said time interval being less than 2 seconds.

9. The method defined in claim 8 wherein said end portion is melted by an electric discharge pulse thereto from a tungsten electrode in inert or in reducing gas, and the weld arc power and time duration and the rate of cooling the molten metal are controlled to achieve a time interval of less than 750milliseconds from melting to solidification.

* * * * *